(12) United States Patent
Naka et al.

(10) Patent No.: US 11,676,628 B1
(45) Date of Patent: Jun. 13, 2023

(54) MULTIPLE-PORTION HARD DISK DRIVE SLIDER PAD CONFIGURATION

(71) Applicant: Western Digital Technologies, Inc., San Jose, CA (US)

(72) Inventors: Kohichiroh Naka, Fujisawa (JP); Takeshi Hyugano, Toshima (JP); Kenichi Murata, Ebina (JP); Yuhsuke Matsumoto, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/541,219

(22) Filed: Dec. 2, 2021

(51) Int. Cl.
  *G11B 5/48* (2006.01)
(52) U.S. Cl.
  CPC ....... *G11B 5/4853* (2013.01); *Y10T 29/49032* (2015.01)
(58) Field of Classification Search
  None
  See application file for complete search history.

(56) References Cited

U.S. PATENT DOCUMENTS

| | | | | |
|---|---|---|---|---|
| 5,465,186 A * | 11/1995 | Bajorek | ................ | G11B 5/48 360/323 |
| 5,796,549 A * | 8/1998 | Sedbrook | ............ | G11B 5/4846 |
| 6,091,155 A * | 7/2000 | Jonaidi | ................ | H05K 1/114 257/773 |
| 6,330,132 B1 * | 12/2001 | Honda | ................ | G11B 5/48 360/234.5 |
| 7,002,779 B2 * | 2/2006 | Zhu | ................ | G11B 5/4853 |
| 7,554,769 B2 * | 6/2009 | Yamakura | ............. | G11B 5/127 360/234.5 |
| 7,619,856 B2 * | 11/2009 | Matsumoto | .......... | H05K 3/3442 360/234.6 |
| 8,259,415 B2 | 9/2012 | Hutchinson et al. | | |
| 8,279,558 B2 | 10/2012 | Limmer et al. | | |
| 8,351,158 B2 | 1/2013 | Zhu et al. | | |
| 9,361,916 B1 * | 6/2016 | Chung | ................ | G11B 5/6082 |
| 9,390,737 B1 * | 7/2016 | Puttichaem | ............ | G11B 5/486 |
| 10,460,754 B2 * | 10/2019 | Matsumoto | .......... | G11B 5/4846 |
| 10,964,342 B1 | 3/2021 | Grimm et al. | | |

(Continued)

OTHER PUBLICATIONS

Kamano, Katayut et al., Back Side Pad Bonding of Hard Disk Head Slider, CMU.J.Nat.Sci Special Issue on Manufacturing Technology, 2011, pp. 29-37, vol. 10(1).

*Primary Examiner* — Craig A. Renner
(74) *Attorney, Agent, or Firm* — John D. Henkhaus

(57) ABSTRACT

A hard disk drive head slider housing a read-write transducer includes a plurality of electrical connection pads, where each electrical pad includes an interconnection portion configured for electrically connecting to an interconnected component, such as a lead suspension, a probe contact portion configured for electrical testing the head slider, and at least one slit positioned between the interconnection portion and the probe contact portion, thereby physically distinguishing and separating the two portions of a multiple-portion pad to inhibit undesirable solder flow to the wider probe contact portion on the slider side of each pad. A more controlled solder joint is provided, while the probe contact portion can remain relatively wide for probe contact and the interconnection portion can remain relatively narrow to reduce solder bridges among the pads.

18 Claims, 6 Drawing Sheets

(56) References Cited

U.S. PATENT DOCUMENTS

2013/0063839 A1 3/2013 Matsumoto et al.
2016/0322072 A1 11/2016 Puttichaem et al.
2019/0122694 A1 4/2019 Davidson et al.

* cited by examiner

MULTIPLE-PORTION HARD DISK DRIVE SLIDER PAD CONFIGURATION

FIELD OF EMBODIMENTS

Embodiments of the invention may relate generally to hard disk drives, and particularly to approaches to electrical pads suitable for both bonding and electrical testing purposes.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

To write data to or read data from the recording medium, the head has to receive instructions from a controller. Hence, the head is electrically connected to the controller in some manner such that not only does the head receive instructions to read/write data, but the head can also send information back to the controller regarding the data read and/or written. Typically, a flexible printed circuit (FPC) mounted on a suspension is used to electrically transmit signals from the read-write head to other electronics within an HDD. At one end, the FPC-suspension assembly and the head are electrically connected together typically with solder at the head slider. To connect these components with solder, the suspension electrical pads and the slider electrical pads are heated, typically using a solder reflow, hot air, or a laser to heat the materials in the bonding procedure.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
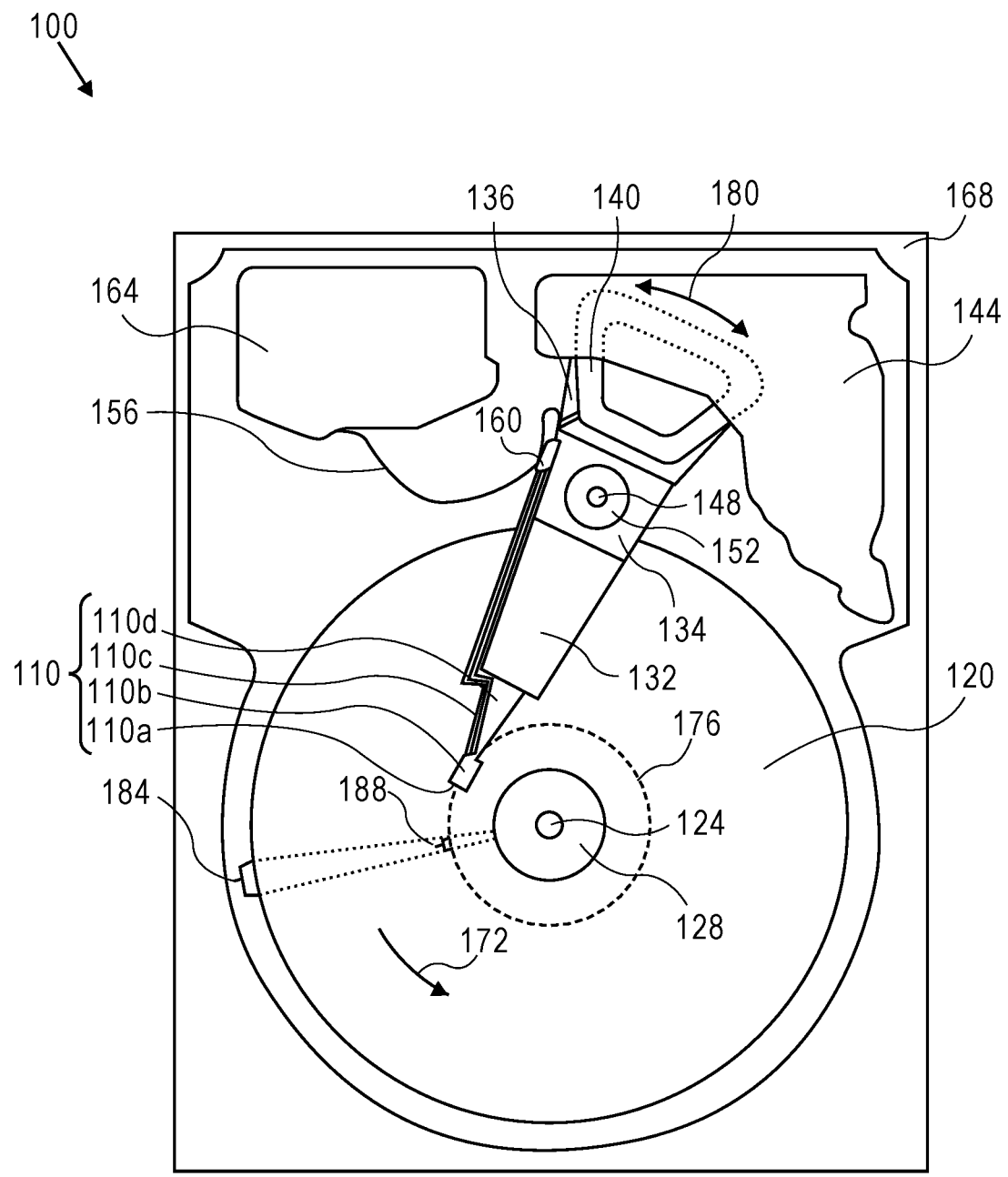
FIG. 1 is a plan view illustrating a hard disk drive, according to an embodiment.

Generally, approaches to electrical pads suitable for both bonding and electrical testing purposes are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a flexible printed circuit (FPC) mounted on a suspension is typically used to electrically transmit signals from the read-write head to other electronics within an HDD, that the FPC-suspension assembly and the head are electrically connected together with solder at the head slider via connection pads on the respective components, and that this bonding procedure can cause an undesirable overflow of the solder in some instances. If this solder overflow is not curtailed, the corresponding electrical interconnections may be compromised (e.g., due to an open connection), which can lead to compromised flow of data to/from the head. Increasing the number of electrical pads at the slider-suspension interface, likely requiring narrower pads, is also likely to exacerbate this overflow challenge even further.

Figure 2:
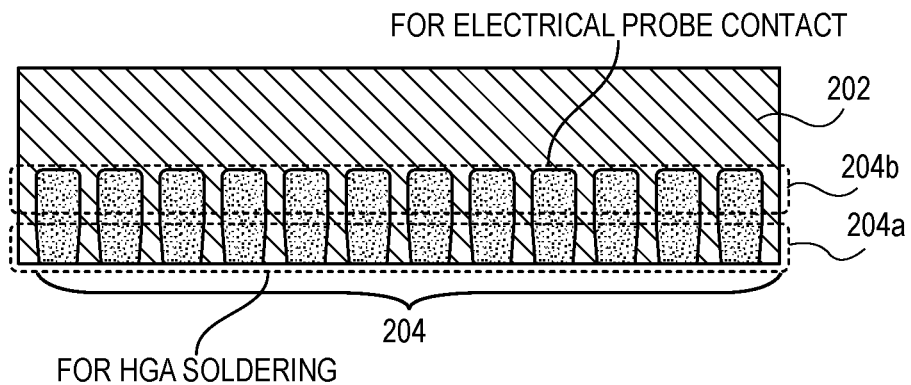
FIG. 2 is a front view illustrating a 12-pad configuration for a head slider, according to an embodiment.
Figure 3A:
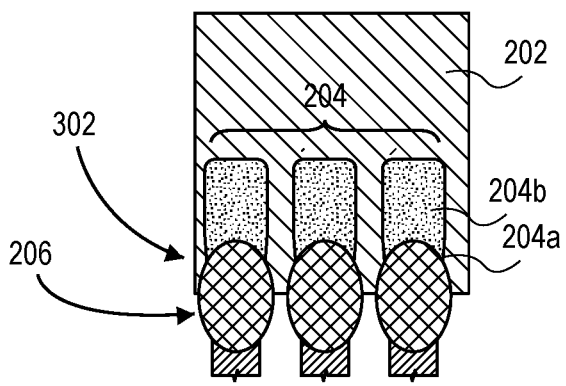
FIG. 3A is a front view illustrating a group of slider electrical pads exemplifying an "ideal" soldering arrangement.
Figure 3B:
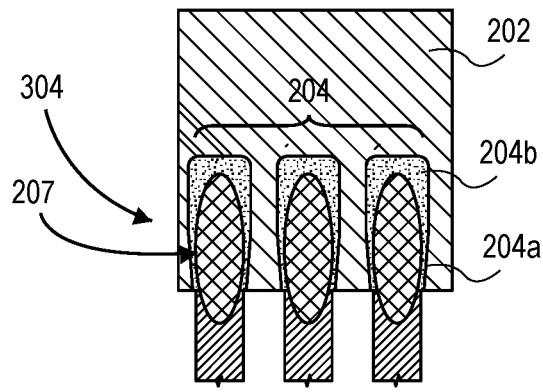
FIG. 3B is a front view illustrating a group of slider electrical pads exemplifying a "poor" soldering arrangement.

FIG. 2 is a front view illustrating a 12-pad configuration for a head slider, according to an embodiment. FIG. 3A is a front view illustrating a group of slider electrical pads exemplifying an "ideal" soldering arrangement, and FIG. 3B is a front view illustrating a group of slider electrical pads exemplifying a "poor" soldering arrangement. The 12-pad configuration of FIG. 2 comprises a head slider 202, on which a plurality of electrical connection pads 204 (or simply "connection pads" or "pads") are coupled. From the viewpoint of the head-gimbal assembly (HGA) soldering process, the required soldering pad 204a area is only for soldering and its width can be relatively narrow. By contrast, a wider test pad 204b width is needed for electrical testing (e.g., dynamic electrical testing, or "DET", of the slider) for electrical probe contact during the slider fabrication process.

With such a configuration of pads 204, in which the soldering pad 204a portion is narrower than the test pad 204b portion, one would prefer the "ideal" soldering arrangement 302 having the solder 206 shape, as illustrated in FIG. 3A. However, it may be the case that the "poor" soldering arrangement 304 of FIG. 3B is obtained, in which a significant amount of the solder 207 flows to the wider test pad 204b portion, i.e., on to the slider side of the pads 204. Likewise, this scenario can result in too little solder 207 flowing to the narrower solder pad 204a portion, i.e., on the suspension side of the pads 204, and thereby may cause an open connection between the head slider 202 and a corresponding lead suspension (see, e.g., lead suspension 110c of FIG. 1) and thus an open or incomplete circuit. One approach to overcoming this challenge may be to employ an anti-wetting layer on the test pad 204b portion (slider side) of the pads 204 to function as a solder dam, but an additional manufacturing process would likely be required to implement such a fix, which would result in a production cost increase. Furthermore, in the case of very small pads, a misaligned layer mask would remain a concern.

Additionally, the number of slider electrical connections and thus connection pads is expected to increase over time due to the implementation of new technologies, such as energy-assisted magnetic recording (EAMR) e.g., heat-assisted magnetic recording (HAMR), microwave-assisted magnetic recording (MAMR), and the like. Consequently, to make room for the additional connection pads the size of the pads are expected to decrease accordingly, which is likely to exacerbate this solder overflow or mis-flow challenge even further, possibly resulting in increasingly more solder defects thereby worsening head gimbal assembly (HGA) yield.

Slit-Separated Multiple-Portion Electrical Connection Pad

Figure 4:
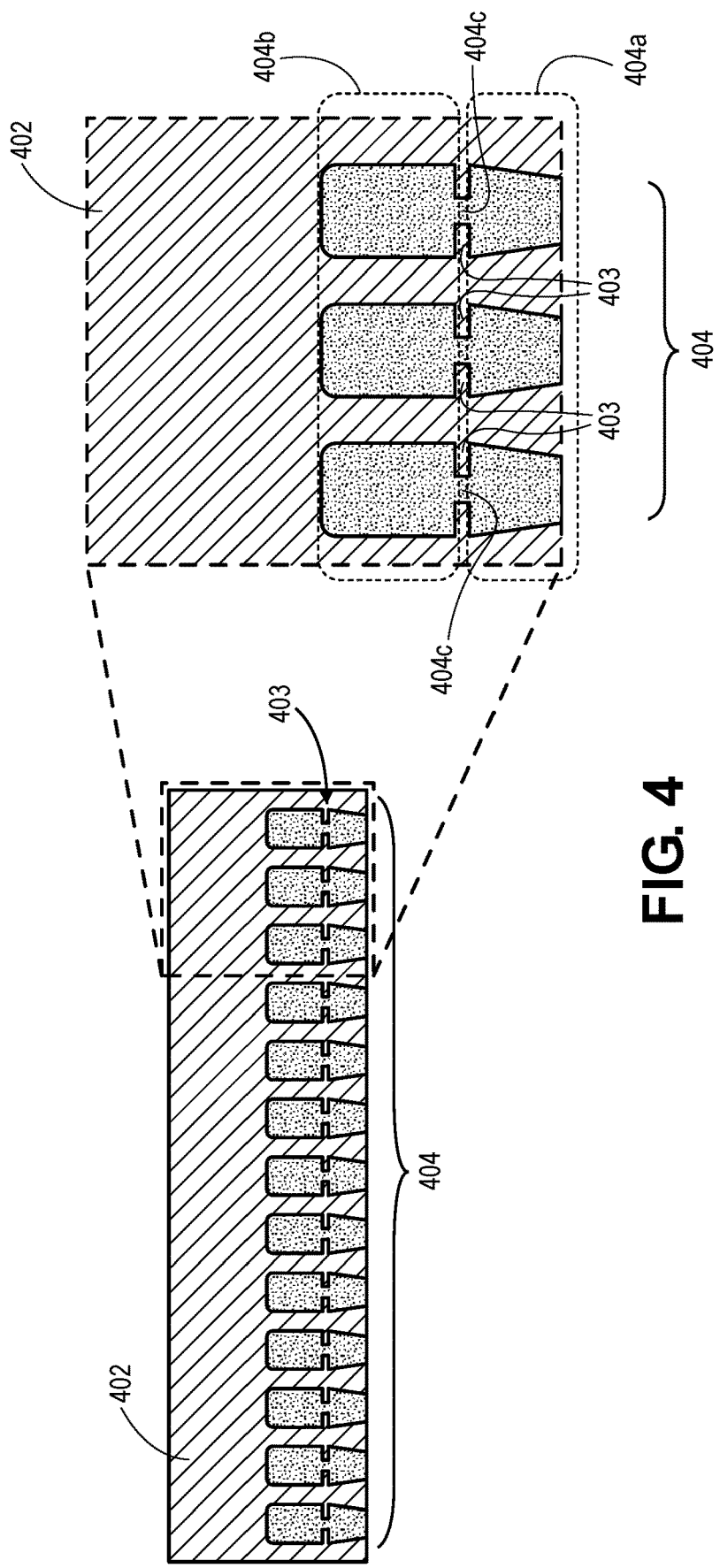
FIG. 4 is a front view illustrating a multiple-portion 13-pad configuration for a head slider, along with a magnified view of a group of the multiple-portion slider electrical pads, according to an embodiment.

FIG. 4 is a front view illustrating a multiple-portion 13-pad configuration for a head slider, along with a magnified view of a group of the multiple-portion slider electrical pads, according to an embodiment. The 13-pad configuration of FIG. 4 comprises a head slider 402, housing a read-write transducer such as read-write head 110a of FIG. 1, on which a plurality of electrical connection pads 404 (or "connection pads" or "electrical pads" or simply "pads") are coupled. Here, an interconnection portion 404a (or "soldering pad" portion) is configured for electrically connecting to an interconnected component, such as for soldering to interconnect with a corresponding suspension (not shown here; see, e.g., lead suspension 110c of FIG. 1), and its width can be relatively narrow and/or tapered as depicted and according to an embodiment. A wider probe contact portion 404b (or "test pad" portion), according to an embodiment, is configured for probe contact for electrical testing of the head slider 402 during the slider fabrication process.

According to an embodiment, to avoid a "poor" soldering arrangement such as soldering arrangement 304 of FIG. 3B, at least one slit 403 is interposed or positioned between the interconnection portion 404a and the probe contact portion 404b, thereby further physically and structurally distinguishing the two portions of the multiple-portion slider pad 404 configuration to inhibit undesirable solder flow to the wider probe contact portion 404b on the slider side of each pad 404. Hence, a more controlled solder joint is provided for by inhibiting the outflow of solder away from the interconnection portion 404a, while the probe contact portion 404b can remain relatively wide for probe contact and the interconnection portion 404a can remain relatively narrow to reduce solder bridges among the pads 404, and open connections between the head slider 402 and a corresponding lead suspension are likely avoided.

As used herein, the term "slit" (e.g., slit 403) generally refers to a narrow cut or opening, which does not extend side-to-side completely through each pad 404. Stated otherwise, the claimed slit is not intended to completely sever or separate the structure of the interconnection portion 404a from the structure of the probe contact portion 404b. Therefore, a connecting portion 404c or similarly functioning structure is maintained to physically and electrically connect the interconnection portion 404a with the probe contact portion 404b.

Figure 5:
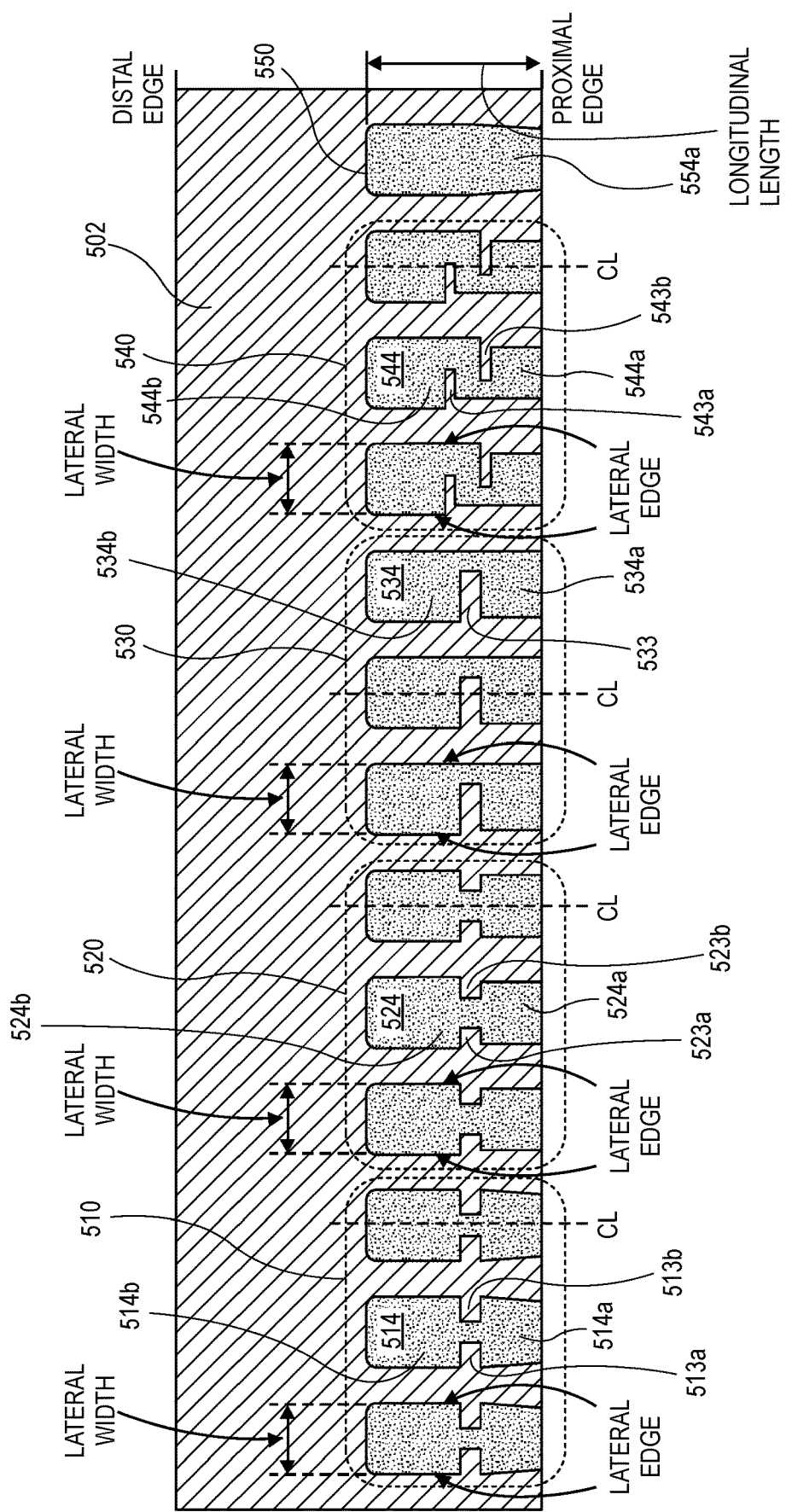
FIG. 5 is a front view diagram illustrating various alternative multiple-portion slider electrical pad configurations, according to embodiments.

FIG. 5 is a front view diagram illustrating various multiple-portion slider electrical pad configurations, according to embodiments. Each grouping of multiple-portion slider electrical pad configurations depicted in FIG. 5, i.e., pad groups 510-540, is shown grouped together by a dashed box or enclosure, with single pad 550 depicted for reference with a traditional shape. FIG. 5 is not intended to denote that each of the pad groups 510-540 is intended to be constituent to a single common head slider 502, rather a single head slider 502 is used here simply to illustrate the various pad groups 510-540 contemplated in a common illustration, for purposes of example and explanation of various embodiments of a multiple-portion slider pad. For reference and as indicated in FIG. 5, each electrical pad (see, e.g., pads 404 of FIG. 4) of each pad group 510-540 has a longitudinal length extending from a proximal edge of the head slider 502 toward a distal edge of the head slider 502 and a lateral width substantially normal to the longitudinal length and extending from a first lateral edge of the electrical pad toward a second opposing lateral edge of the electrical pad.

According to an embodiment, the at least one slit (see slit 403 of FIG. 4) of pad group 510 comprises a first slit 513a extending laterally from a first lateral edge of the electrical pad 514 toward a centerline ("CL") of the electrical pad 514, and a second slit 513b extending laterally from a second lateral edge of the electrical pad 514 toward the centerline of the electrical pad 514. Here, the interconnection portion 514*a* has a tapered shape, similar to the interconnection portion 554*a* of reference pad 550, while the probe contact portion 514*b* has a substantially constant lateral width, according to an embodiment. According to an embodiment, the first slit 513*a* and the second slit 513*b* are positioned at a substantially same position along the longitudinal length.

According to an embodiment, the at least one slit (see slit 403 of FIG. 4) of pad group 520 comprises a first slit 523*a* extending laterally from a first lateral edge of the electrical pad 524 toward a centerline ("CL") of the electrical pad 524, and a second slit 523*b* extending laterally from a second lateral edge of the electrical pad 524 toward the centerline of the electrical pad 524. Here, the interconnection portion 524*a* has a substantially constant first lateral width while the probe contact portion 524*b* has a substantially constant second lateral width different from (e.g., wider than) the first lateral width, according to an embodiment. According to an embodiment, the first slit 523*a* and the second slit 523*b* are positioned at a substantially same position along the longitudinal length.

According to an embodiment, the at least one slit (see slit 403 of FIG. 4) of pad group 530 comprises only a single slit 533 extending laterally from a first lateral edge or a second opposing lateral edge of the electrical pad 534 toward a centerline ("CL") of the electrical pad 534. Thus, while depicted as extending from the left-hand lateral edge of electrical pad 534, slit 533 may extend from the right-hand lateral edge of electrical pad 534 and fall within the scope of this embodiment. Here, the interconnection portion 534*a* has a substantially constant first lateral width while the probe contact portion 534*b* has a substantially constant second lateral width different from (e.g., wider than) the first lateral width, according to an embodiment.

According to an embodiment, the at least one slit (see slit 403 of FIG. 4) of pad group 540 comprises a first slit 543*a* extending laterally from a first lateral edge of the electrical pad 544 toward a centerline ("CL") of the electrical pad 544, and a second slit 543*b* extending laterally from a second lateral edge of the electrical pad 544 toward the centerline of the electrical pad 544, where the first slit 543*a* and the second slit 543*b* are positioned at different positions along the longitudinal length. According to an embodiment, at least a portion of the interconnection portion 544*a* has a first lateral width while at least a portion of the probe contact portion 544*b* has a second lateral width different from (e.g., wider than) the first lateral width.

Figure 6:
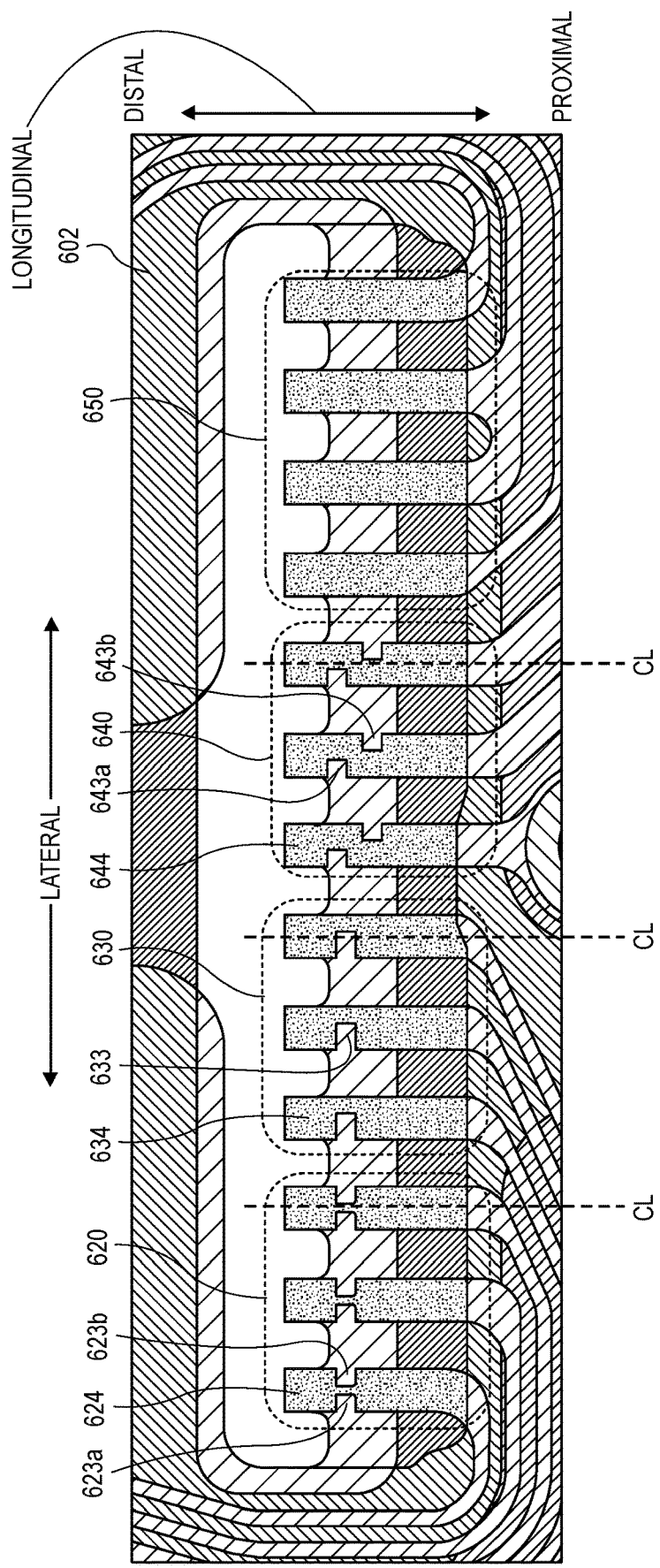
FIG. 6 is a top view illustrating various alternative multiple-portion suspension electrical pad configurations, according to an embodiment.

A similar concept and similar multiple-portion electrical pad configurations as described herein for a head slider (e.g., head slider 402, 502 of FIGS. 4-5) may also be implemented in the context of a lead suspension (see, e.g., lead suspension 110*c* of FIG. 1). FIG. 6 is a top view illustrating various alternative multiple-portion suspension electrical pad configurations, according to an embodiment. Each grouping of multiple-portion suspension electrical pad configurations depicted in FIG. 6, i.e., pad groups 620-640, is shown grouped together by a dashed box or enclosure, with single-portion pad group 650 depicted for reference with a traditional shape. Here again, FIG. 6 is not intended to denote that each of the pad groups 620-640 is intended to be constituent to a single common suspension 602, rather a single suspension 602 is used here simply to illustrate the various pad groups 620-640 contemplated in a common illustration, for purposes of example and explanation of various embodiments of a multiple-portion suspension pad. For reference and similarly to as indicated in FIG. 5, each electrical pad of each pad group 620-640 has a longitudinal length extending from a proximal edge of the suspension 602 toward a distal edge of the suspension 602 and a lateral width substantially normal to the longitudinal length and extending from a first lateral edge of the electrical pad toward a second opposing lateral edge of the electrical pad.

According to an embodiment, the at least one slit of pad group 620 comprises a first slit 623*a* extending laterally from a first lateral edge of the electrical pad 624 toward a centerline ("CL") of the electrical pad 624, and a second slit 623*b* extending laterally from a second lateral edge of the electrical pad 624 toward the centerline of the electrical pad 624. According to an embodiment, the first slit 623*a* and the second slit 623*b* are positioned at a substantially same position along the longitudinal length.

According to an embodiment, the at least one slit of pad group 630 comprises only a single slit 633 extending laterally from a first lateral edge or a second opposing lateral edge of the electrical pad 634 toward a centerline ("CL") of the electrical pad 634. Thus, while depicted as extending from the left-hand lateral edge of electrical pad 634, slit 633 may extend from the right-hand lateral edge of electrical pad 634 and fall within the scope of this embodiment.

According to an embodiment, the at least one slit of pad group 640 comprises a first slit 643*a* extending laterally from a first lateral edge of the electrical pad 644 toward a centerline ("CL") of the electrical pad 644, and a second slit 643*b* extending laterally from a second lateral edge of the electrical pad 644 toward the centerline of the electrical pad 644, where the first slit 643*a* and the second slit 643*b* are positioned at different positions along the longitudinal length.

Method for Manufacturing Electrical Connection Pads on a Component

Figure 7:
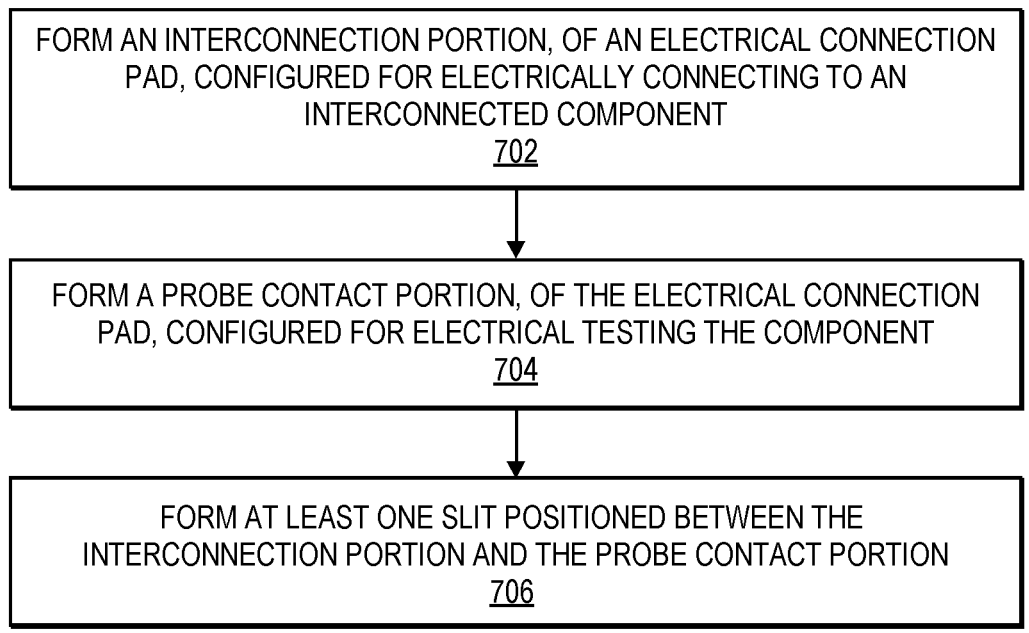
FIG. 7 is a flowchart illustrating a method for manufacturing electrical connection pads on a component, according to an embodiment.

FIG. 7 is a flowchart illustrating a method for manufacturing electrical connection pads on a component, according to an embodiment. More particularly, the following method blocks apply to a method for forming a plurality of electrical connection pads, where for each electrical connection pad the following blocks 702-706 are performed.

At block 702, form an interconnection portion, of an electrical connection pad, configured for electrically connecting to an interconnected component. For example, interconnection portion 404*a* (FIG. 4), 514*a*, 524*a*, 534*a*, 544*a* (FIG. 5) is formed on a head slider 402 (FIG. 4), 502 (FIG. 5). For another example, a similar interconnection portion may be formed on a suspension 602 (FIG. 6).

At block 704, form a probe contact portion, of the electrical connection pad, configured for electrical testing the component. For example, probe contact portion 404*b* (FIG. 4), 514*b*, 524*b*, 534*b*, 544*b* (FIG. 5) is formed on the head slider 402 (FIG. 4), 502 (FIG. 5). For another example, a similar probe contact portion may be formed on a suspension 602 (FIG. 6).

At block 706, form at least one slit positioned between the interconnection portion and the probe contact portion. For example, slit 403 (FIG. 4), 513*a* and 513*b* of pad group 510 (FIG. 5), 523*a* and 523*b* of pad group 520 (FIG. 5), 533 of pad group 530 (FIG. 5), 543*a* and 543*b* of pad group 540 (FIG. 5) is/are formed between each interconnection portion 404*a* (FIG. 4), 514*a*, 524*a*, 534*a*, 544*a* (FIG. 5) and each corresponding probe contact portion 404*b* (FIG. 4), 514*b*, 524*b*, 534*b*, 544*b* (FIG. 5) of the head slider 402 (FIG. 4), 502 (FIG. 5).

Use of a described slit arrangement to further physically and structurally distinguish and separate the two portions of a multiple-portion slider pad functions to inhibit undesirable solder flow to the wider probe contact portion on the slider side of each pad. Hence, a more controlled solder joint is provided for by inhibiting the outflow of solder away from the interconnection portion, while the probe contact portion can remain relatively wide for probe contact and the interconnection portion can remain relatively narrow to reduce solder bridges among the pads, e.g., from one pad to an adjacent pad.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head slider housing a read-write transducer, the head slider comprising:
   a plurality of electrical connection pads each having a longitudinal length extending from a proximal edge of the head slider toward a distal edge of the head slider and a lateral width substantially normal to the longitudinal length and extending from a first lateral edge of the electrical connection pad toward a second opposing lateral edge of the electrical connection pad, each electrical connection pad comprising:
      an interconnection portion configured for electrically connecting to an interconnected component;
      a probe contact portion configured for electrical testing the head slider; and
      a first slit extending in the lateral width direction substantially normal to the longitudinal length, from the first lateral edge of the electrical connection pad toward a centerline of the electrical connection pad, and
      a second slit extending in the lateral width direction substantially normal to the longitudinal length, from the second lateral edge of the electrical connection pad toward the centerline of the electrical connection pad.

2. The head slider of claim 1, wherein the interconnection portion is at least in part narrower than the probe contact portion.

3. The head slider of claim 1, wherein the first slit and the second slit are positioned at a substantially same position along the longitudinal length.

4. The head slider of claim 1, wherein the first slit and the second slit are positioned at different positions along the longitudinal length.

5. The head slider of claim 1, wherein:
   each probe contact portion has a substantially constant first lateral width substantially normal to the longitudinal length; and
   each interconnection portion has tapered lateral edges.

6. The head slider of claim 1, wherein:
   each probe contact portion has a substantially constant first lateral width substantially normal to the longitudinal length; and
   each interconnection portion has a substantially constant second lateral width substantially normal to the longitudinal length and different from the first lateral width.

7. A hard disk drive comprising the head slider of claim 1.

8. A method for manufacturing electrical connection pads on a component, the method comprising:
   forming a plurality of electrical connection pads each having a longitudinal length extending from a proximal edge of the component toward a distal edge of the component and a lateral width substantially normal to the longitudinal length and extending from a first lateral edge of the electrical connection pad toward a second opposing lateral edge of the electrical connection pad, for each electrical connection pad:
      forming an interconnection portion configured for electrically connecting to an interconnected component;
      forming a probe contact portion configured for electrical testing the component; and
      forming a first slit extending in the lateral width direction substantially normal to the longitudinal length, from the first lateral edge of the electrical connection pad toward a centerline of the electrical connection pad, and
      forming a second slit extending in the lateral width direction substantially normal to the longitudinal length, from the second lateral edge of the electrical connection pad toward the centerline of the electrical connection pad.

9. The method of claim 8, wherein:
   the component comprises a recording head slider; and
   forming the plurality of electrical connection pads includes forming the interconnection portion at least in part narrower than the probe contact portion.

10. The method of claim 8, wherein forming the first and second slits comprises forming the first slit at a position along the longitudinal length and forming the second slit at a substantially same position along the longitudinal length as the first slit.

11. The method of claim 8, wherein forming the first and second slits comprises forming the first slit at a first position along the longitudinal length and forming the second slit at a second position along the longitudinal length different from the first position.

12. The method of claim 8, wherein:
forming each probe contact portion comprises forming a substantially constant first lateral width substantially normal to the longitudinal length; and
forming each interconnection portion comprises forming tapered lateral edges.

13. The method of claim 8, wherein:
the component comprises a lead suspension; and
each electrical connection pad has a longitudinal length extending from a proximal edge of the lead suspension toward a distal edge of the lead suspension;
forming each probe contact portion comprises forming a substantially constant first lateral width of the probe contact portion substantially normal to the longitudinal length; and
forming each interconnection portion comprises forming the substantially constant first lateral width of the interconnection portion.

14. A hard disk drive (HDD) comprising:
a plurality of recording media rotatably mounted on a spindle;
a plurality of head sliders each housing a respective read-write transducer configured to read from and to write to at least one recording media of the plurality of recording media;
means for moving the plurality of head sliders to access portions of the at least one recording media;
means for transmitting electrical signals to and from a respective head slider of the plurality of head sliders; and
wherein each head slider comprises a plurality of electrical connection pads each having a longitudinal length extending from a proximal edge of a corresponding head slider toward a distal edge of the corresponding head slider and a lateral width substantially normal to the longitudinal length and extending from a first lateral edge of the electrical connection pad toward a second opposing lateral edge of the electrical connection pad, each electrical connection pad comprising:
an interconnection portion configured for electrically connecting to an interconnected component,
a probe contact portion configured for electrical testing the head slider, and
a first slit extending in the lateral width direction substantially normal to the longitudinal length, from the first lateral edge of the electrical connection pad toward a centerline of the electrical connection pad, and
a second slit extending in the lateral width direction substantially normal to the longitudinal length, from the second lateral edge of the electrical connection pad toward the centerline of the electrical connection pad.

15. The HDD of claim 14, wherein the first slit and the second slit are positioned at a substantially same position along the longitudinal length.

16. The HDD of claim 14, wherein the first slit and the second slit are positioned at different positions along the longitudinal length.

17. The HDD of claim 14, wherein:
each probe contact portion has a substantially constant first lateral width substantially normal to the longitudinal length; and
each interconnection portion has tapered lateral edges.

18. The HDD of claim 14, wherein:
each probe contact portion has a substantially constant first lateral width substantially normal to the longitudinal length; and
each interconnection portion has a substantially constant second lateral width substantially normal to the longitudinal length and different from the first lateral width.

* * * * *